Jan. 25, 1927.

W. M. DANN

TEMPERATURE INDICATING DEVICE

Filed Aug. 11, 1923

1,615,684

INVENTOR
Walter M. Dann
BY
ATTORNEY

Patented Jan. 25, 1927.

1,615,684

UNITED STATES PATENT OFFICE.

WALTER M. DANN, OF WILKINSBURG, PENNSYLVANIA, ASSIGNOR TO WESTINGHOUSE ELECTRIC & MANUFACTURING COMPANY, A CORPORATION OF PENNSYLVANIA.

TEMPERATURE-INDICATING DEVICE.

Application filed August 11, 1923. Serial No. 656,974.

My invention relates to temperature indicating devices such as are adapted to be employed in connection with electrical apparatus.

One object of my invention is to provide a temperature indicating device such that an external indication is given of the thermal condition obtaining within the conductors of the windings of electrical apparatus.

Another object of my invention is to provide a temperature indicating device for electrical translating devices that is responsive to the medium within the casing as well as to the value of the current traversing the electrical translating device.

A further object of my invention is to provide a temperature indicating device for electrical apparatus in which the expansive properties of a thermoresponsive fluid is employed for the purpose of actuating a suitable signaling device.

It is a still further object of my invention to provide a temperature indicating device in which are reproduced the conditions of heat generation and heat dissipation which are present in the windings of the associated electrical device.

In my copending application, Serial No. 468,717, filed May 11, 1921, (Case No. 8202), and assigned to the Westinghouse Electric & Manufacturing Company, I have shown and described a thermally-actuated device for controlling the cooling coils commonly used in connection with oil-insulated electrical devices. The present case is an adaptation of a similar thermal control device to an external indicator. In the present invention, I also provide a suitable heat insulated member with means for reproducing therein a thermal condition which corresponds to that existing in the associated electrical windings.

Figure 1:
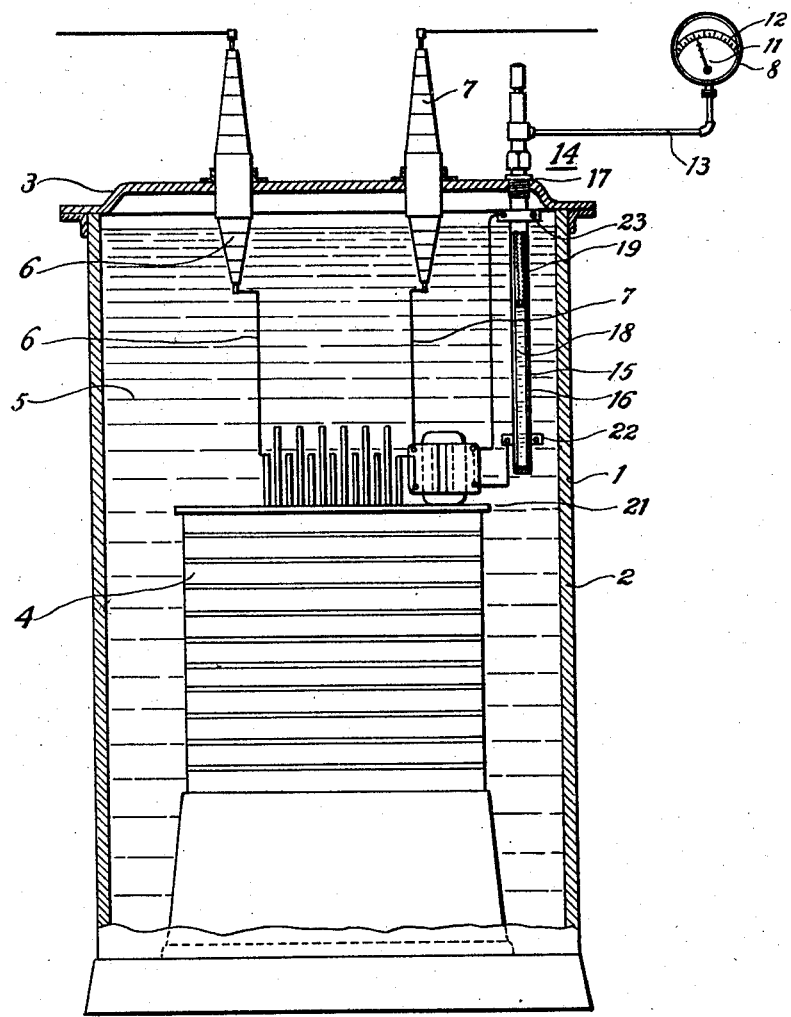
Figure 2:
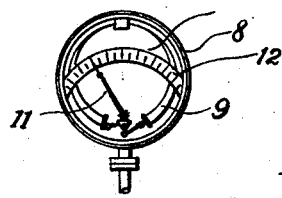

In the accompanying drawings,

Figure 1 is a sectional view of a transformer equipped with my improved temperature indicating device, and Fig. 2 is a face view of the indicator employed in the embodiment of my invention.

In the several figures of the drawing, like reference numerals indicate similar parts.

In the preferred embodiment of my invention, an electrical translating device 1, such as a transformer, comprises a casing 2 and a cover 3, in which the coils 4 are mounted. The coils 4 are surrounded by a suitable insulating fluid 5, such as oil, while conductors 6 and 7 serve to connect the coils 4 with an external source of electromotive force.

In order to provide an indication of the thermal condition obtaining within the device 1, I provide an indicator 8 which, as shown in Fig. 2, is in the form of a Bourdon tube 9. A pointer 11 is actuated by the Bourdon tube 9 and co-operates with a stationary scale 12 which is preferably calibrated in terms of temperature. The indicator 8 is connected by a pipe 13 to a thermostat 14 which is inserted in the cover member 3.

The thermostat 14 comprises a tube 15 of suitable high resistance material, such as Monel metal. The tube 15 is surrounded by a suitable heat-insulating or lagging member 16, such, for example, as a micarta tube. The insulating member 16 is designed to reproduce the temperature drop between the copper of the coils 4 and the surrounding oil 5. The tube 15 is secured, by suitable pipe connections 17, to the cover 3 and the pipe 13. Within the tube 15, there is placed a suitable thermally-expansive fluid 18, such as mercury. If desired, a suitable resilient member 19, such as a corrugated collapsible tombac tube, may be placed in the tube 15 for the purpose of increasing the pressure of the fluid 18 during temperature increases.

The primary coil of a current transformer 21 is placed in circuit with the conductor 7. The secondary coil of the current transformer 21 is attached by suitable terminal members 22 and 23 near the ends of the tube 15 and in electrical connection therewith.

Since the tube 15 is immersed in the insulating oil 5, the temperature of the latter medium is transmitted to the fluid 18 within the tube 15 causing a corresponding temperature in the fluid. The current traversing the conductor 7 produces a proportional current traversing the secondary coil thereof, which current in traversing the high resistance material of the tube 15, produces a temperature in it which is transmitted to the fluid 18 within the tube 15. This increment of temperature added to that transmitted from the insulating oil produces thermal conditions substantially similar to those of the conductors of the electrical coils 4.

The volume of the fluid 18 varies in accordance with the changes in the temperature of the tube 15. However, the total variation in the volume of the fluid 18 is a result of the combined thermal condition of the surrounding fluid medium 5 and the current traversing the coils 4. This variation in the volume of the fluid 18 is transmitted by means of the pipe 13 to the Bourdon tube 9 which, in turn, actuates the indicator 12 to a predetermined point on the scale 12. The scale 12, being calibrated in terms of temperature, provides direct visual indication of the thermal condition within the casing 2.

It will thus be seen that I have provided a thermal indicator for electrical translating devices which is operated directly by the expansive action of a thermally expansible fluid. The fluid is influenced by the combined thermal effect of the temperature of the surrounding insulating medium and by current which corresponds in value to the current traversing the associated electrical translating device.

It is to be understood that various types of pressure operated devices, such as relays, may be substituted in lieu of the indicator 8.

I do not wish to be restricted to the specific circuit connections or arrangement of parts herein set forth, as various modifications thereof may be effected within the spirit and scope of my invention. I desire, therefore, that only such limitations shall be imposed as are indicated in the appended claims.

I claim as my invention:

1. The combination with an electrical translating device comprising a fluid insulating medium, and a current conductor, of a device comprising a container immersed in said insulating medium, a thermo-expansive fluid in said container, means for connecting said container in circuit with said current conductor for heating the fluid contained therein, and an indicator actuated in accordance with the variations in the heat transferred to said thermo-expansive fluid.

2. The combination with an electrical-energy-translating device comprising a fluid insulating medium and a current conductor, of a device comprising a metal container having a relatively high electrical resistance and immersed in said insulating medium, a thermo-expansive fluid in said container, means electrically connected to said current conductor for causing a current to traverse said container, and a thermal indicator actuated in accordane with the variations in the volume of said thermo-expansive fluid.

3. The combination with an electrical-energy-translating device comprising a fluid insulating medium and a current conductor, of a device comprising a metal container having a relatively high electrical resistance and immersed in said insulating medium, a thermo-expansive fluid in said container, means electrically connected to said current-conductor for causing a current to traverse said container, said current being directly in accordance with the value of the current traversing said current conductor, and a thermal indicator actuated in accordance with the variations in the volume of said thermo-expansive fluid.

4. The combination with an electrical-energy-translating device comprising a fluid insulating medium and a current conductor, of a device comprising a metal container having a relatively high electrical resistance and immersed in said insulating medium, a heat-insulating member surrounding said container, a thermo-expansive fluid in said container, means electrically connected to said current conductor for causing a current to traverse said container, and a thermal indicator actuated in accordance with the variations in the volume of said thermo-expansive fluid.

In testimony whereof, I have hereunto subscribed my name this 2nd day of August 1923.

WALTER M. DANN.